US010439526B2

United States Patent
Tian

(10) Patent No.: US 10,439,526 B2
(45) Date of Patent: Oct. 8, 2019

(54) LOAD-ADAPTIVE SMOOTH STARTUP METHOD FOR SENSORLESS FIELD-ORIENTED CONTROL OF PERMANENT MAGNET SYNCHRONOUS MOTORS

(71) Applicant: LINESTREAM TECHNOLOGIES, Cleveland, OH (US)

(72) Inventor: Gang Tian, Westlake, OH (US)

(73) Assignee: DANFOSS POWER ELECTRONICS A/S, Grasten (DK)

( * ) Notice: Subject to any disclaimer, the term of this patent is extended or adjusted under 35 U.S.C. 154(b) by 0 days.

(21) Appl. No.: 15/996,603

(22) Filed: Jun. 4, 2018

(65) Prior Publication Data
US 2018/0278187 A1   Sep. 27, 2018

Related U.S. Application Data

(63) Continuation of application No. 15/155,184, filed on May 16, 2016, now Pat. No. 9,998,044, which is a
(Continued)

(51) Int. Cl.
*H02P 21/00* (2016.01)
*H02P 6/18* (2016.01)
(Continued)

(52) U.S. Cl.
CPC .............. *H02P 6/181* (2013.01); *H02P 6/182* (2013.01); *H02P 6/20* (2013.01); *H02P 6/21* (2016.02); *H02P 21/34* (2016.02)

(58) Field of Classification Search
CPC .................................. H02P 6/181; H02P 6/21
(Continued)

(56) References Cited

U.S. PATENT DOCUMENTS

| 4,926,105 A | 5/1990 | Mischenko et al. |
| 5,739,664 A | 4/1998 | Deng et al. |

(Continued)

FOREIGN PATENT DOCUMENTS

EP   0 171 880   2/1986

OTHER PUBLICATIONS

P. Kshirsagar, et al. "Implementation and Sensorless Vector-Control Design and Tuning Strategy for SMPM Machines in Fan-Type Applications," IEEE Transactions on Industry Application, vol. 48, No. 6, pp. 2062-2069, 2006.
(Continued)

*Primary Examiner* — Erick D Glass
(74) *Attorney, Agent, or Firm* — Amin, Turocy & Watson LLP

(57) ABSTRACT

A field oriented control (FOC) system and method provides smooth field-oriented startup for three-phase sensorless permanent magnet synchronous motors (PMSMs) despite the absence of load information. The system uses the rotor flux projection on the d- or q-axis to determine whether the stator flux current reference being applied during reference startup phase is sufficient to spin the PMSM, thereby providing smooth operation during the reference startup phase and saving energy relative to applying rated current. The system also determines a suitable initial value for the stator torque current reference to use at the start of closed-loop sensorless FOC control mode based on an angle difference between the reference and estimated angles. Since this angle difference is reflective of the load on the PMSM, the selected initial value allows the system to achieve a smooth transition from reference startup mode to closed-loop sensorless FOC control mode.

20 Claims, 14 Drawing Sheets

Related U.S. Application Data continuation of application No. 14/663,586, filed on Mar. 20, 2015, now Pat. No. 9,369,073.

(51) Int. Cl.
  *H02P 6/20*   (2016.01)
  *H02P 6/21*   (2016.01)
  *H02P 21/34*  (2016.01)
  *H02P 6/182*  (2016.01)

(58) Field of Classification Search
  USPC .................................................. 318/400.02
  See application file for complete search history.

(56) References Cited

U.S. PATENT DOCUMENTS

| | | | |
|---|---|---|---|
| 6,008,618 A | 12/1999 | Bose et al. | |
| 6,605,912 B1 | 8/2003 | Bharadwaj et al. | |
| 6,760,669 B2 | 7/2004 | Patel et al. | |
| 6,876,169 B2 | 4/2005 | Gallegos-Lopez et al. | |
| 6,924,617 B2 | 8/2005 | Schulz et al. | |
| 6,940,251 B1 | 9/2005 | Sarlioglu et al. | |
| 6,984,960 B2 | 1/2006 | Stancu et al. | |
| 7,116,070 B2 | 10/2006 | MacKay | |
| 7,193,387 B1 | 3/2007 | Lu et al. | |
| 7,211,984 B2 | 5/2007 | Patel et al. | |
| 8,350,517 B2 | 1/2013 | Stichweh | |
| 8,796,974 B2 | 8/2014 | Wang et al. | |
| 8,816,616 B2 | 8/2014 | Costanzo et al. | |
| 8,928,265 B2 | 1/2015 | Qin et al. | |
| 8,981,702 B2 | 3/2015 | Katariya et al. | |
| 9,660,564 B2 | 5/2017 | Zhao et al. | |
| 2006/0055363 A1 | 3/2006 | Patel et al. | |
| 2006/0131986 A1 | 6/2006 | Hsu et al. | |
| 2007/0001635 A1 | 1/2007 | Ho | |
| 2009/0140592 A1 | 6/2009 | Rahman et al. | |
| 2009/0251109 A1 | 10/2009 | Larsen | |
| 2013/0175955 A1 | 7/2013 | Son et al. | |
| 2014/0152212 A1 | 6/2014 | Zhang et al. | |
| 2014/0333241 A1 | 11/2014 | Zhao et al. | |

OTHER PUBLICATIONS

R. T. Marius Fatu, et al. "I-F Starting Method with Smooth Transition to EMF Based Motion-Sensorless Vector Control of PM Synchronous Motor/Generator," Power Electronics Specialists Conference, pp. 1481-1487, 2008.

Kai-Sheng Kan, et al. Adaptive Soft Starting Method with Current Limit Strategy for Sensorless BLDC Motors, IEEE International Symposium on Industrial Electronics (ISIE), pp. 605-610, 2012.

Xiaodong Liang, et al. "Induction Motor Starting in Practical Industrial Applications" IEEE Transactions on Industry Applications, vol. 47, No. 1, pp. 271-280, Nov. 9, 2010.

International Search Report & Written Opinion for PCT Application Serial No. PCT/US2016/023436, dated Jun. 29, 2016, 7 pages.

Poescu. "Induction Motor Modelling for Vector Control Purposes", Helsinki University of Technology, Laboratory of Electromechanics Report Espoo 2000, http://www.motor-design.com/cmsAdmin/uploads/induction_motor_modelling.pdf, Retrieved May 24, 2016.

Non-Final Office Action for U.S. Appl. No. 15/155,184 dated Aug. 29, 2017.

ROTOR FLUX PROJECTION ON THE D- AND Q- AXES

LOAD-ADAPTIVE SMOOTH STARTUP METHOD FOR SENSORLESS FIELD-ORIENTED CONTROL OF PERMANENT MAGNET SYNCHRONOUS MOTORS

CROSS-REFERENCE TO RELATED APPLICATIONS

This application is a Continuation of U.S. application Ser. No. 15/155,184, filed on May 16, 2016, and entitled "LOAD-ADAPTIVE SMOOTH STARTUP METHOD FOR SENSORLESS FIELD-ORIENTED CONTROL OF PERMANENT MAGNET SYNCHRONOUS MOTORS," which is a Continuation of U.S. application Ser. No. 14/663,586, filed on Mar. 20, 2015, and entitled "LOAD-ADAPTIVE SMOOTH STARTUP METHOD FOR SENSORLESS FIELD-ORIENTED CONTROL OF PERMANENT MAGNET SYNCHRONOUS MOTORS," the entirety of both of which are incorporated herein by reference.

TECHNICAL FIELD

This disclosure generally relates to sensorless control of permanent magnet synchronous motors (PMSMs), and specifically to load-adaptive smooth startup techniques

BACKGROUND

Permanent magnet synchronous motors (PMSMs) are used in a wide variety of applications. FIG. 1 is a simplified diagram of an example PMSM 100. PMSMs typically comprise a rotor 108 configured to rotate within a stator 102. Permanent magnets 106 are mounted on or buried within the rotor 108 (PMSMs with permanent magnets that are buried within the rotor are referred to as interior permanent magnet, or IPM, motors). The stator 102 includes a number of electrical windings 104 arranged to surround the rotor 108. During operation, electrical current through the windings 104 sets up a magnetic field within the air gap 110 between the rotor 108 and the stator 102, and the interaction between the magnets 106 and the magnetic field causes the rotor 108 to rotate, producing torque. The speed and direction of the rotor 108 can be controlled by controlling the current through the stator windings 104.

PMSMs are often controlled using field oriented control (FOC) techniques. However, since sensorless PMSMs lack directly measured load information, smooth transition from the stopped state to closed-loop sensorless FOC control of a PMSM can be difficult. This is because, lacking information regarding the load on the PMSM, the FOC control system may be designed to apply an excessive amount of torque during the transition to ensure that the motor achieves a minimum amount of speed to generate usable back-electromagnetic force (back-EMF) information. This excessive torque can cause the motor to over-speed or stall.

The above-described is merely intended to provide an overview of some of the challenges facing conventional motion control systems. Other challenges with conventional systems and contrasting benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its purpose is to present some concepts of one or more embodiments in a simplified form as a prelude to the more detailed description that is presented later.

One or more embodiments of the present disclosure provide systems and methods for achieving smooth field-oriented startup for three-phase sensorless PMSMs with unknown load. Beginning with the PMSM at rest, a reference startup FOC phase begins when a motor control system gradually increases a current reference used to drive the motor. As the current reference is increased, the motor control system determines the rotor flux projection on the reference d- or q-axis, and uses this projection to determine whether the current reference being applied during the reference startup phase is sufficient to spin the PMSM. The system can continue increasing the current reference until the rotor flux projection reaches a defined level, which causes the motor to spin with respect to the reference speed.

For the transition from the reference startup FOC phase to the closed-loop sensorless FOC control phase, the motor control system determines the offset between the reference angle and the estimated angle, which is a function of the load on the PMSM. The control system then determines an initial reference value for the applied current based on this angle difference, and uses this initial reference value as the starting point for the closed-loop sensorless FOC phase, gradually transitioning the current reference signals to the initial values of the closed-loop sensorless FOC phase. Since this initial reference value is based on the load seen by the PMSM, the transition from the reference startup FOC phase to the closed-loop sensorless FOC control phase will be smooth.

For transition back to reference startup control from the closed-loop sensorless FOC control, the current reference previously obtained during reference startup control can be used as an initial value.

The following description and the annexed drawings set forth herein detail certain illustrative aspects of the one or more embodiments. These aspects are indicative, however, of but a few of the various ways in which the principles of various embodiments can be employed, and the described embodiments are intended to include all such aspects and their equivalents.

DETAILED DESCRIPTION

Figure 1:
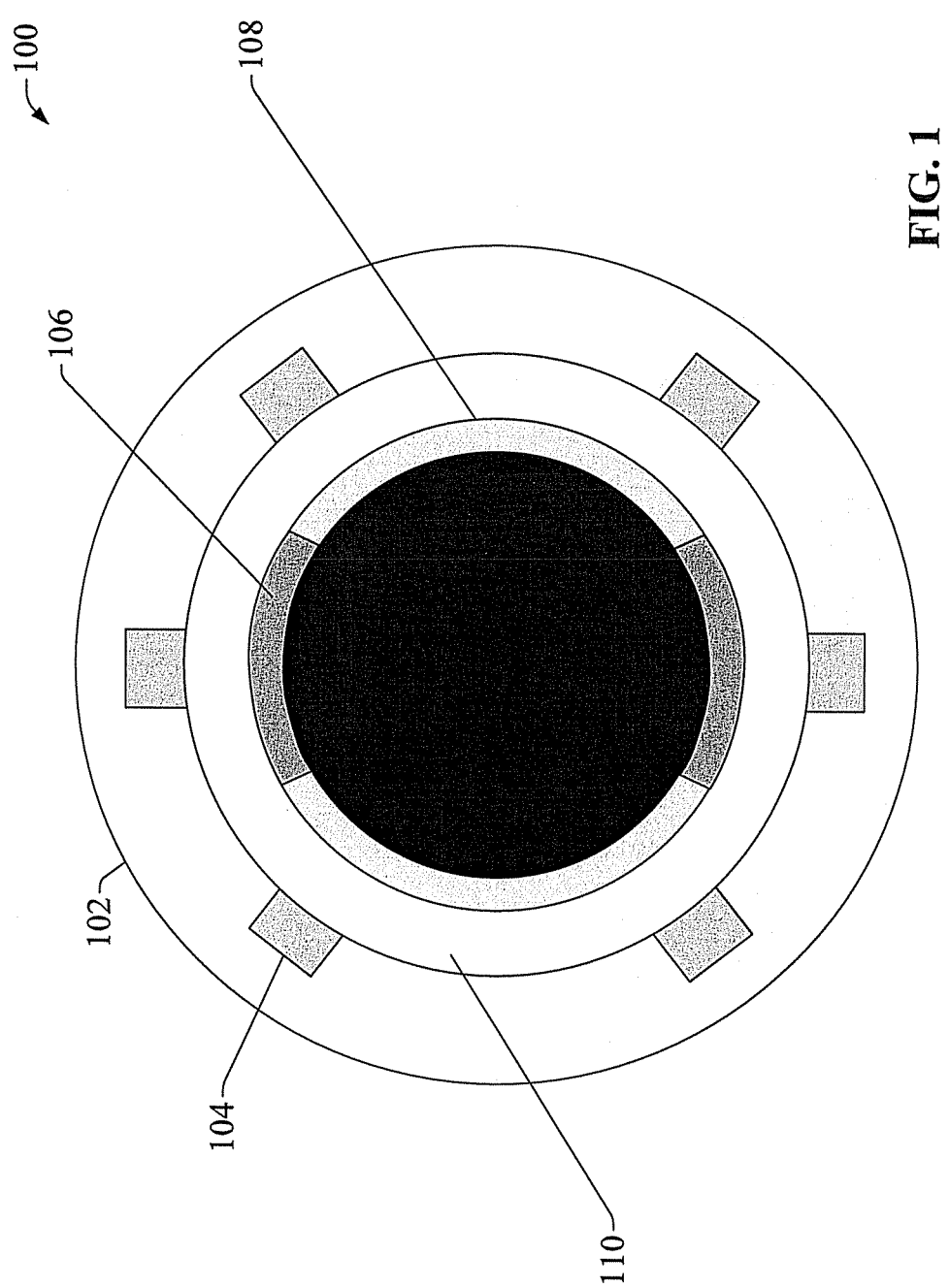
FIG. 1 is a simplified diagram of an example PMSM.

Various embodiments are now described with reference to the drawings, wherein like reference numerals refer to like elements throughout. In the following description, for the purposes of explanation, numerous specific details are set forth in order to provide an understanding of this disclosure. It is to be understood, however, that such embodiments may be practiced without these specific details, or with other methods, components, materials, etc. In other instances, structures and devices are shown in block diagram form to facilitate describing one or more embodiments.

Permanent magnet synchronous motors (PMSMs) are used in a wide variety of applications. For example, many industrial automation applications rely on PMSMs and their associated control systems to drive motion of system components (e.g., machining or material handling robots, conveyors, tooling machines, hand tools, etc.). PMSMs are also used in the traction and/or propulsion systems of some electric vehicle designs, including but not limited to electric or hybrid electric automobiles, bicycles, forklifts and other industrial vehicles, scooters, railway vehicle such as trains, and other such vehicles. PMSMs also have application in building infrastructure and HVAC (heating, ventilating, and air conditioning) applications that require speed or motion control, such as fans and pumps. PMSMs can also be found in many home and industrial appliances; for example, PMSMs can be used drive the drums of home or industrial washing machines, to control the spinning of centrifuges, or to control the motion of other such appliances.

Figure 2:
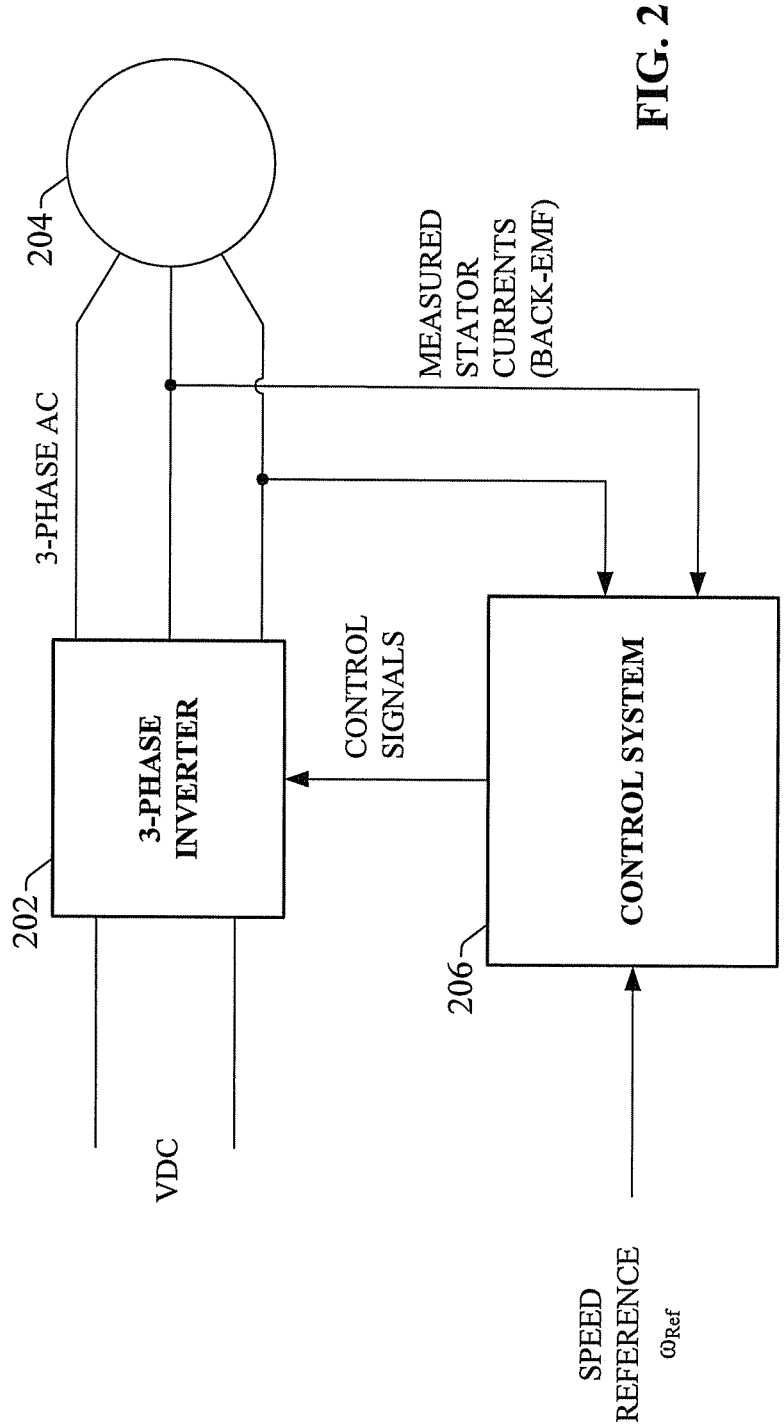
FIG. 2 is a simplified diagram of an example control system for a sensorless PMSM.

FIG. 2 is a simplified diagram of an example control system for a sensorless PMSM. PMSMs are often controlled using field oriented control (FOC) methods. Control system 206 drives the PMSM 204 in accordance with a speed reference signal. A 3-phase inverter 202 controls the 3-phase AC power to the PMSM's stator windings based on control signals (e.g., pulse width modulation signals, space vector modulation signals, etc.) generated by the control system 206. The control system 206 estimates the angle and speed of the PMSM based on measured stator currents (in the example illustrated in FIG. 2, only two phases are measured, since the third phase can be calculated by the control system based on measurements of the other two phases).

Figure 3:
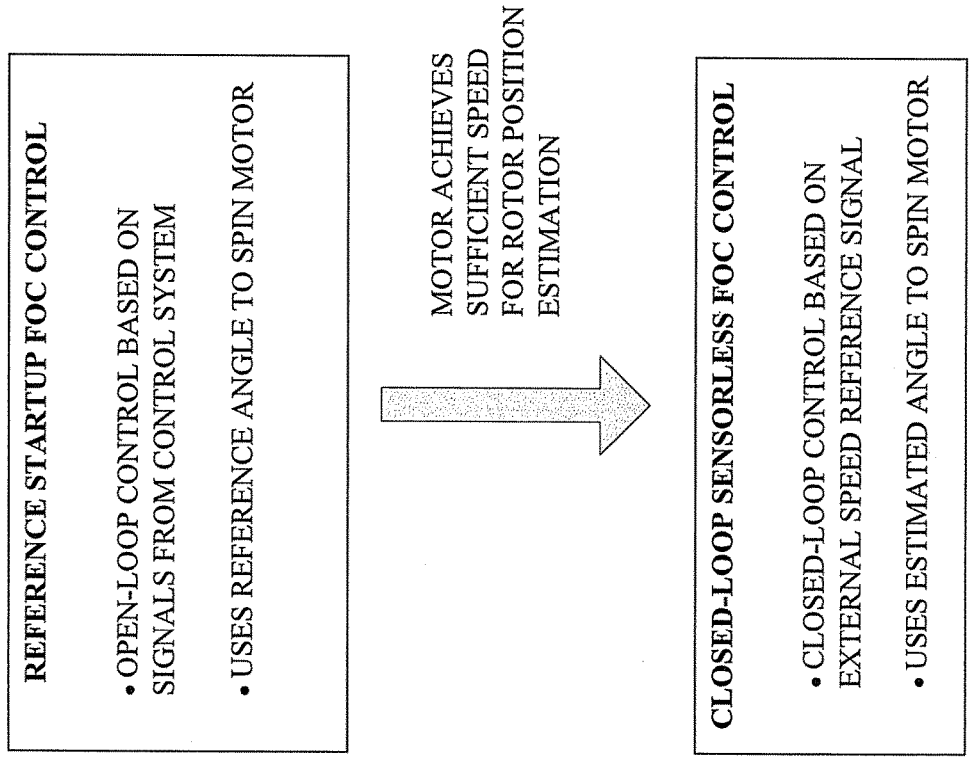
FIG. 3 illustrates transition of a PMSM control system from reference startup FOC control mode to closed-loop sensorless FOC control mode.

PMSMs are often controlled using field oriented control (FOC) techniques. According to FOC, the flux and torque components of the stator currents are controlled independently by the control system based on the external speed reference signal and the estimated rotor position. For sensorless motors, the control system estimates the rotor position based on the back electromagnetic force (back-EMF) measured from the motor windings. However, before closed-loop control can be achieved, the PMSM must first be rotating at a minimum speed in order for a sufficient amount of back-EMF to be generated for the control system to accurately estimate the rotor angle. Consequently, FOC control systems for sensorless PMSMs typically execute a two-stage startup procedure, illustrated in FIG. 3.

From the stopped position, the control system first executes a reference startup FOC control phase, in which the control system performs open-loop control of the motor using internally generated reference signals in order to transition the motor from zero speed to the minimum speed required for closed-loop control. During this phase, the speed loop is open, and estimated angle and speed are not used. The control system typically uses a reference angle together with an applied current reference in order to attract the poles of the rotor's permanent magnets and initiate motion. In accordance with FOC control techniques, the reference angle is used to rotate the d-axis and q-axis of the d-q coordinate system in order to spin the motor from zero speed to the minimum speed. The control system may use any suitable acceleration to generate current reference signals (e.g., a ramping or stepping function) until the minimum speed is reached. When the minimum speed for accurate rotor position estimation is achieved, the control system switches to closed-loop sensorless FOC control, which performs closed loop control of the PMSM based on an external speed reference signal and the estimated position and speed determined based on the measured back-EMF. Closed-loop sensorless FOC control uses the estimated angle to rotate the d-axis and q-axis in order to apply torque and flux control in accordance with the speed control reference signal.

The startup procedure for a sensorless PMSM can be difficult given the absence of load information, since the amount of current required to initiate spinning of the motor is a function of the load on the motor. During startup, it is common to apply the rated current for the motor as a default in order to initiate spinning of the motor. However, since the rated current is typically greater than the current required to spin the motor, application of the rated current needlessly wastes energy. Moreover, the excessive current applied during the reference startup phase can make smooth transition from the reference startup phase to the closed-loop sensorless FOC control phase difficult.

A common approach for transitioning from the reference startup phase to the closed-loop sensorless FOC control phase is to gradually transition from the reference angle used to drive the motor during the reference startup phase to the estimated angle used during the closed-loop sensorless FOC control phase. However, in the absence of load information, it can be difficult to determine the appropriate amount of torque to apply as the starting point for the closed-loop control phase. As a result, inappropriate torque during the angle transition introduces a speed error, which can cause the motor to stall or over-speed if large enough. For some types of electric motor applications, such as electric vehicles, these speed errors are not acceptable.

Systems and methods described herein relate to techniques for achieving smooth and energy-efficient startup FOC control and transition between reference startup FOC control and closed-loop sensorless FOC control. According to one or more embodiments, the rotor flux projection on the d- or q-axis is used to adjust the current reference generated by the motor control system in order to spin the motor smoothly during the reference startup FOC phase without the need for load information.

In addition, once the system determines that a sufficient amount of current reference is being applied to spin the PMSM, the system determines the difference between the reference angle and the estimated angle, which is assumed to be a function of the load on the PMSM. The system uses this angle difference to determine an initial torque reference for the closed-loop sensorless FOC control phase. This initial torque reference can facilitate smooth transition from reference startup FOC control to closed-loop sensorless FOC control.

Figure 4:
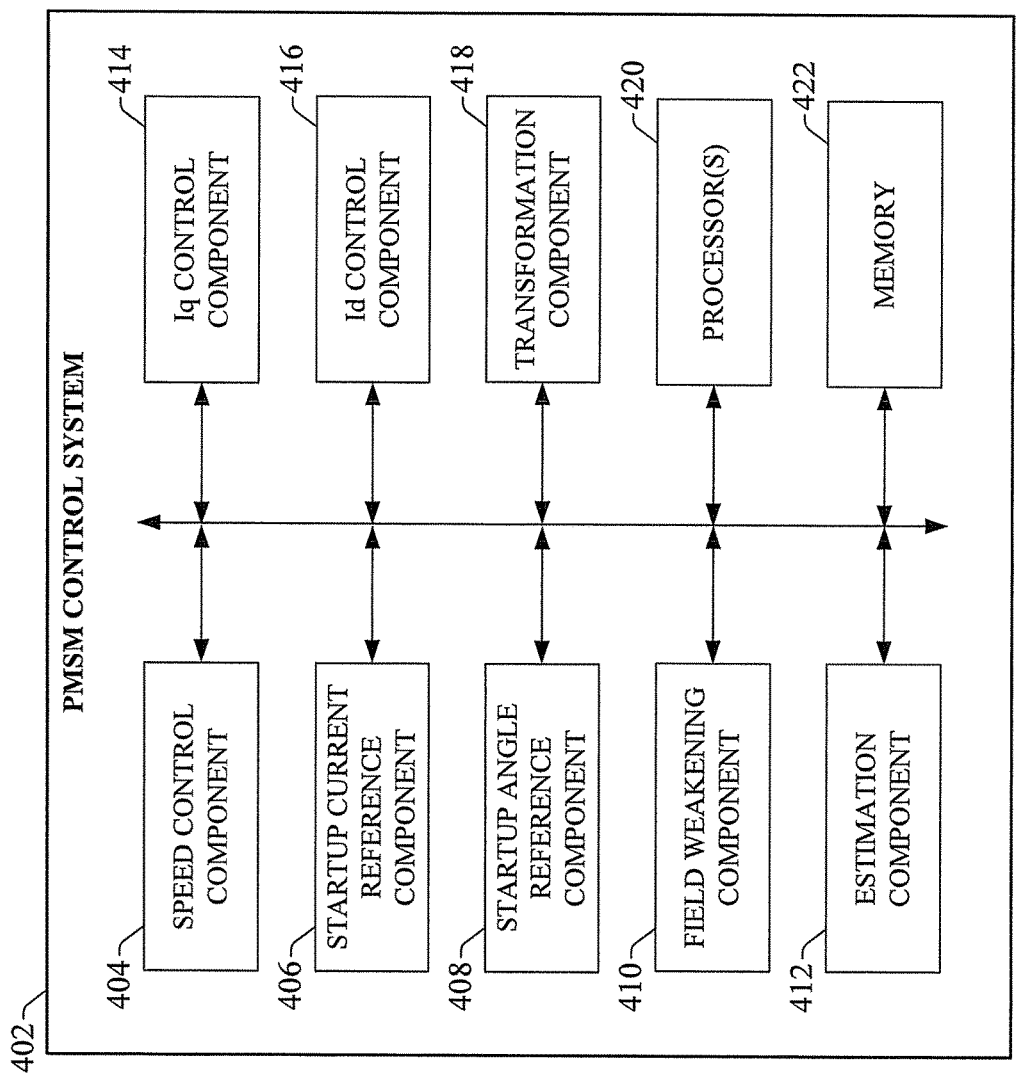
FIG. 4 is a block diagram of an example PMSM control system.

FIG. 4 is a block diagram of an example PMSM control system according to one or more embodiments. PMSM control system 402 can include a speed control component 404, a startup current reference component 406, a startup angle reference component 408, a field weakening component 410, an estimation component 412, an Iq control component 414, an Id control component 416, a transformation component 418, one or more processors 420, and memory 422. In various embodiments, one or more of the speed control component 404, startup current reference component 406, startup angle reference component 408, field weakening component 410, estimation component 412, Iq control component 414, Id control component 416, transformation component 418, the one or more processors 420, and memory 422 can be electrically and/or communicatively coupled to one another to perform one or more of the functions of the PMSM control system 402. In some embodiments, components 404, 406, 408, 410, 412, 414, 416, and 418 can comprise software instructions stored on memory 422 and executed by processor(s) 420. The PMSM control system 402 may also interact with other hardware and/or software components not depicted in FIG. 4. For example, processor(s) 420 may interact with one or more external user interface devices, such as a keyboard, a mouse, a display monitor, a touchscreen, or other such interface devices.

Speed control component 404 can be configured to control the value of a torque reference $I_{sqRef}$ based on the error between a speed reference $\omega_{Ref}$ and an estimated speed $\omega_{Est}$ during closed-loop sensorless FOC control mode. Startup current reference component 406 can be configured to control values of a flux reference $I_{sdRef}$ and torque $I_{sqRef}$ during reference startup control mode. Startup angle reference component 408 can be configured to determine a value of a reference angle $\theta_{Ref}$ during reference startup control mode. Field weakening component 410 can be configured to control the value of flux reference $I_{sdRef}$ during closed-loop sensorless FOC control mode. Estimation component 412 can be configured to determine estimated values for the motor's position and velocity based on back-EMF values measured from the motor windings.

Iq control component 414 can be configured to control a torque reference voltage value $V_{sq}$ based on a detected error between a measured stator current value $I_{sq}$ and its corresponding reference value $I_{sqRef}$. Id control component 416 can be configured to control a flux reference voltage value $V_{sd}$ based on a detected error between a measured stator current value $I_{sd}$ and its corresponding reference value $I_{sdRef}$. Transformation component 418 can be configured to perform mathematical transformations on signals generated or measured by the PMSM control system 402 (e.g., forward and reverse Park transforms, Clarke transforms, etc.).

The one or more processors 420 can perform one or more of the functions described herein with reference to the systems and/or methods disclosed. Memory 422 can be a computer-readable storage medium storing computer-executable instructions and/or information for performing the functions described herein with reference to the systems and/or methods disclosed.

Figure 5:
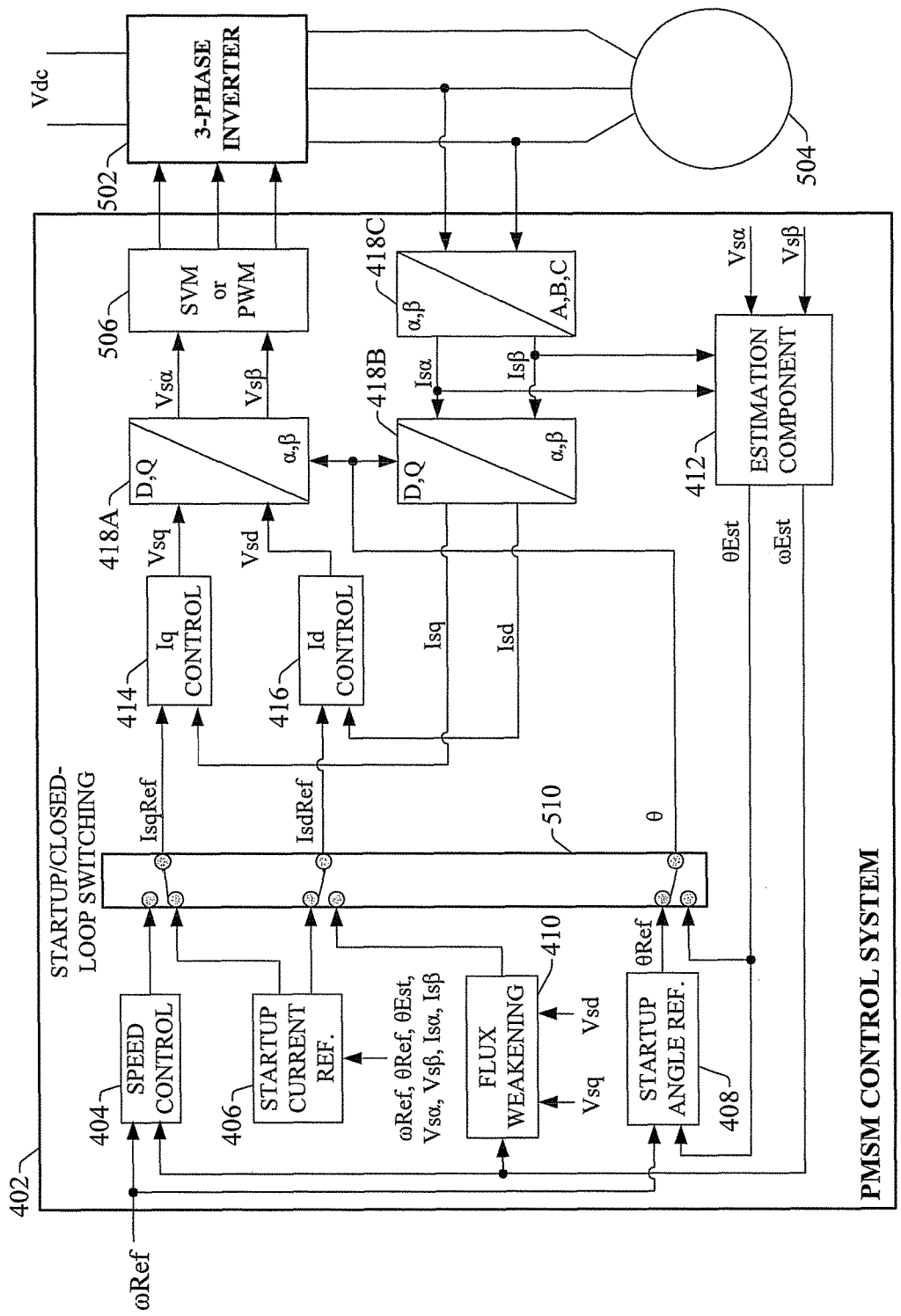
FIG. 5 is a block diagram of an example configuration for a PMSM control system that implements one or more features for smooth transitioning between reference startup FOC control and closed-loop sensorless FOC control.

FIG. 5 illustrates an example, non-limiting configuration for a PMSM control system 402 that implements one or more features described herein for smooth transitioning between reference startup FOC control and closed-loop sensorless FOC control. In an example embodiment, PMSM control system can be implemented as part of a motor drive (e.g., a variable frequency drive) that controls motion of a PMSM in accordance with a speed reference signal $\omega_{Ref}$ provided by a supervisory motion control application or system. In another example embodiment, PMSM control system 402 may be implemented on one or more processing chips as part of an embedded system for controlling a PMSM. In yet another example embodiment, PMSM control system 402 can be implemented as part of a motor control module of an industrial controller for control of a PMSM used in an industrial motion control system. It is to be appreciated that the techniques described herein are not limited to these implementations.

PMSM 504 is a sensorless motor whose motion is controlled by PMSM control system 402. In general, the PMSM control system 402 controls the PMSM using a flux control loop and a torque control loop. Torque reference $I_{sqRef}$ and the flux reference $I_{sdRef}$ represent target references for the torque and flux components, respectively, of the stator currents. As will be described in more detail below, the values of $I_{sqRef}$ and $I_{sdRef}$ are controlled differently depending on whether the PMSM control system 402 is operating in the reference startup mode or closed-loop sensorless FOC control mode. To provide feedback for the flux and torque control loops, the PMSM control system 402 measures the stator currents on two phases of the three-phase AC power delivered to PMSM 504 and calculates the current for the third phase based on the values of the other two phases. Alternatively, the PMSM control system 402 may measure all three phases in order to obtain the stator currents. A transformation block 418C (implemented by transformation component 418) transforms the stator current measurements from the three-phase A,B,C reference to the stationary $\alpha,\beta$ coordinate framework (e.g., a Clarke transformation) to yield $I_s\alpha$ and $I_s\beta$. Transformation block 418B (also implemented by transformation component 418) transforms $I\alpha$ and $I\beta$ to the rotary d,q coordinate framework (e.g., a Park transformation) to yield $I_{sq}$ and $I_{sd}$. Iq control component 414 and Id control component 416 compare the values of $I_{sq}$ and $I_{sd}$ to their corresponding reference values $I_{sqRef}$ and $I_{sdRef}$, and adjust reference voltage values $V_{sq}$ and $V_{sd}$ based on any detected errors between the measured values $I_{sq}$ and $I_{sq}$ and their corresponding reference values $I_{sqRef}$ and $I_{sdRef}$.

Transformation block 418A (implemented by transformation component 418) transforms $V_{sq}$ and $V_{sd}$ from the rotary d,q framework to the stationary $\alpha,\beta$ framework (e.g., an inverse Park transform) to yield $V_{s\alpha}$ and $V_{s\beta}$. Based on these values, a control signal output component, such as a space vector modulation (SVM) component or pulse width modulation (PWM) component 506, controls the AC output of a 3-phase inverter 502, thereby controlling motion of the PMSM. During closed-loop sensorless FOC control operation, estimation component 412 estimates the angle and speed of the PMSM 504 based on measured stator currents $I_{sc}$, and $I_{sp}$ and reference voltage values $V_{s\alpha}$ and $V_{s\beta}$. The estimated velocity $\omega_{Est}$ is compared with a speed reference $\omega_{Ref}$ (which may be received from a separate supervisory control system or application), and the speed control component 404 adjusts $I_{sqRef}$ as needed based on detected errors between the speed reference $\omega_{Ref}$ and the estimated velocity $\omega_{Est}$.

If the PMSM is starting from a rest position, before initiating closed-loop sensorless FOC control, the control system must first execute a reference startup FOC control sequence in order to spin the motor at a sufficiently large minimum velocity in order to generate sufficient amount of back-EMF on the motor windings to accurately estimate the rotor angle. As described in more detail below, one or more embodiments of PMSM control system 402 uses the rotor flux projection on the reference d-axis in order to determine when the applied stator flux current reference $I_{sdRef}$ is large enough to spin the motor. This technique can mitigate the need to apply an excessively large (e.g., rated) current during the reference startup phase, thereby reducing energy consumption relative to systems that use the rated current as the reference current during reference startup operation. Moreover, as will also be described in more detail below, the system determines an initial stator torque current reference value $I_{sqRef}$ to use at the start of the closed-loop sensorless control phase based on the difference between the reference angle $\theta_{Ref}$ and the estimated angle $\theta_{est}$. Since this angle difference is reflective of the load on the PMSM, initial torque reference $I_{sqRef}$ determined using the techniques implemented by PMSM control system 402 can facilitate a smooth transition between reference startup mode and closed-loop sensorless FOC control mode.

Figure 6:
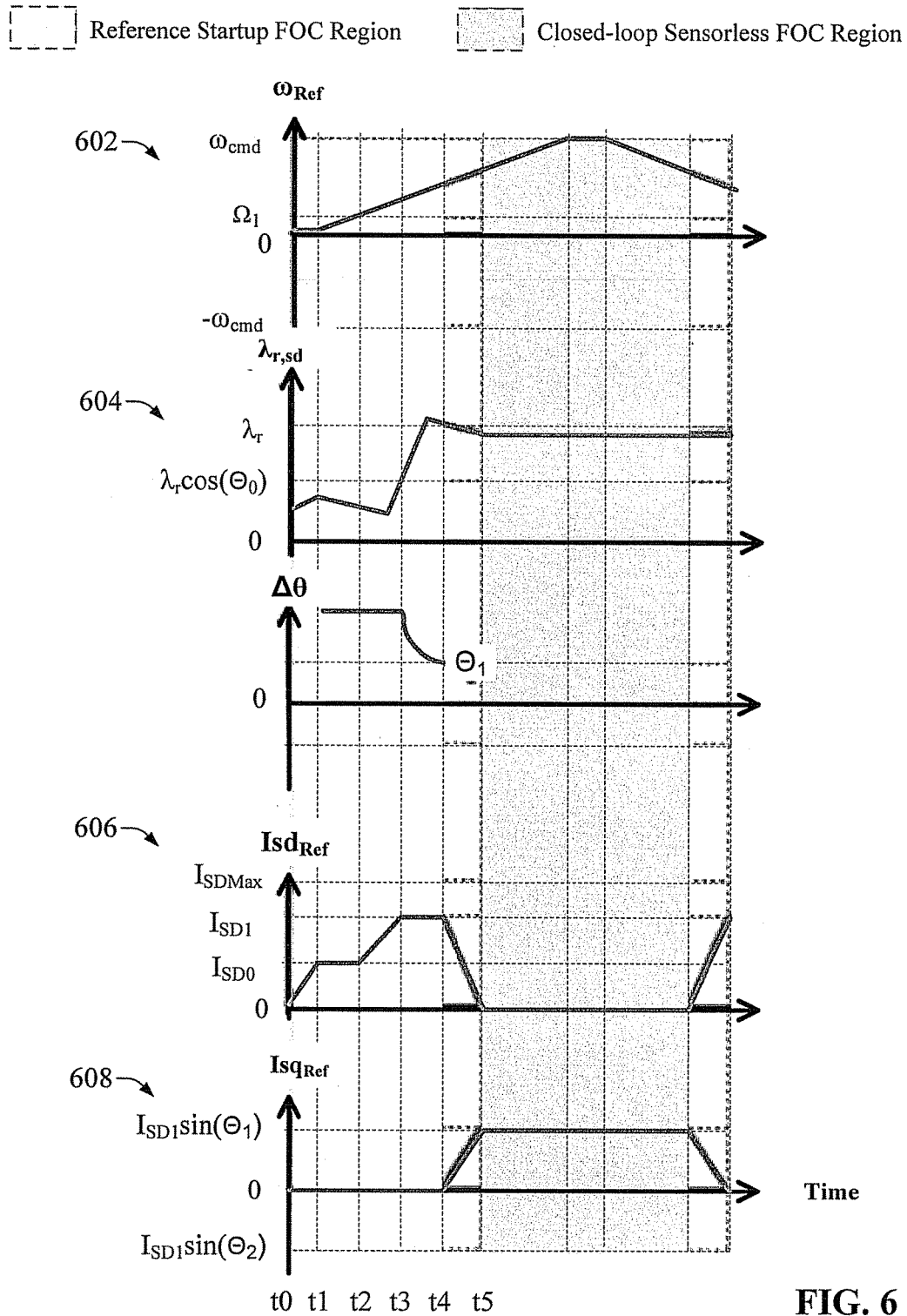
FIG. 6 is a set of timing charts illustrating the values of speed reference $\omega_{Ref}$, projection $\lambda_{r,sd}$, angle reference $\Delta\theta$, stator flux current reference $I_{sdRef}$ and stator torque current reference $I_{sqRef}$ over time for an example control sequence of a PMSM.

An example control sequence is now described with reference to FIGS. 5 and 6. FIG. 6 is a set of timing charts illustrating the values of speed reference $\omega_{Ref}$; rotor flux projection on reference d-axis $\lambda_{r,sd}$; stator flux current reference $I_{sdRef}$; and stator torque current reference $I_{sqRef}$ over time for an example control sequence of a PMSM. This example illustrates a load-adaptive smooth startup method according to one or more embodiments of the present disclosure. As noted above, PMSM control system 402 controls reference values $I_{sdRef}$ and $I_{sqRef}$ differently depending on whether the control system 402 is operating in reference startup control mode or closed-loop sensorless FOC control mode. This variable control is represented by switching component 510, which is shown in FIG. 5 as being configured for reference startup operation. That is, for the reference startup phase, $I_{sdRef}$ and $I_{sqRef}$ are controlled by startup current reference component 406, and reference angle $\theta_{Ref}$ generated by the startup angle reference component 408 is used by the torque and flux control loops rather than the estimated angle $\theta_{est}$.

At time t=0, the PMSM is at rest. To initiate reference startup FOC control, the startup current reference component 406 gradually increases the flux reference $I_{sdRef}$ to a predefined value $I_{SD0}$. Although any suitable value for $I_{SD0}$ can be used, $I_{SD0}$ will generally be smaller than the rated current; e.g., 20% of the rated current. From time t=0 to t1, reference $I_{sdRef}$ increases from zero to $I_{SD0}$, as shown in timing chart 606.

When $I_{sdRef}$ has reached $I_{SD0}$ at time t=t1, a reference speed signal $\omega_{Ref}$ is received, as shown in timing chart 602.

The reference speed signal is gradually increased to $\omega_{cmd}$, e.g., a target speed prescribed by a master control application that provides the reference speed signal to the PMSM control system 402.

Prior to reaching $\omega_{cmd}$, $\omega_{Ref}$ will reach a predefined threshold value $\Omega_1$ at time t=t2. Upon reaching the predefined threshold value $\Omega_1$, the startup current reference component 406 determines the rotor flux projection on the d-axis $\lambda_{r,sd}$ based on the following equation:

$$\lambda_{r,sd} = \lambda_{sd} - L_{sd}I_{sd} \quad (1)$$

where $\lambda_{sd}$ is the stator flux along the d-axis, $L_{sd}$ is the stator inductance along the d-axis (which can be obtained from the motor data sheet for the PMSM or measured using a self-commissioning method), and $I_{sd}$ is the stator current along the d-axis.

The stator flux $\lambda_{sd}$ in equation (1) can be obtained based on the measured back-EMF voltages (e.g., by the estimation component 412) using any suitable method. In an example, non-limiting technique for obtaining the stator flux $\lambda_{sd}$, the measured back-EMF voltages are used to determine the stator flux in the $\alpha$, $\beta$ stationary framework coordinate system according to the following equations:

$$\lambda_{s\alpha} = \int (V_{s\alpha} - R_s I_{s\alpha}) dt \quad (2)$$

$$\lambda_{s\beta} = \int (V_{s\beta} - R_s I_{s\beta}) dt \quad (3)$$

where $\lambda_{s\alpha}$ and $\lambda_{s\beta}$ are the stator flux along the $\alpha$- and $\beta$-axes (the stationary framework coordinate system), $V_{s\alpha}$ and $V_{s\beta}$ are the applied stator voltages along the $\alpha$- and $\beta$-axes (generated by transformation block 418A), $I_{s\alpha}$ and $I_{s\beta}$ are the measured stator currents along the $\alpha$- and $\beta$-axes (determined by transformation block 418C based on the measured stator currents), and $R_s$ is the stator resistance (obtained from the motor data sheet or measured using any suitable self-commissioning method).

The stator flux in the d,q rotary framework coordinate system is then determined using the Park transformation of the flux in the stationary framework:

$$(\lambda_{sd}, \lambda_{sq}) = \text{Park}(\lambda_{s\alpha}, \lambda_{s\beta}) \quad (4)$$

where $\lambda_{sd}$ and $\lambda_{sq}$ are the stator flux along the d- and q-axes (the rotary framework coordinate system). The resulting value of $\lambda_{sd}$ is used in equation (1) to determine the rotor flux projection on the d-axis $\lambda_{r,sd}$.

Figure 7:
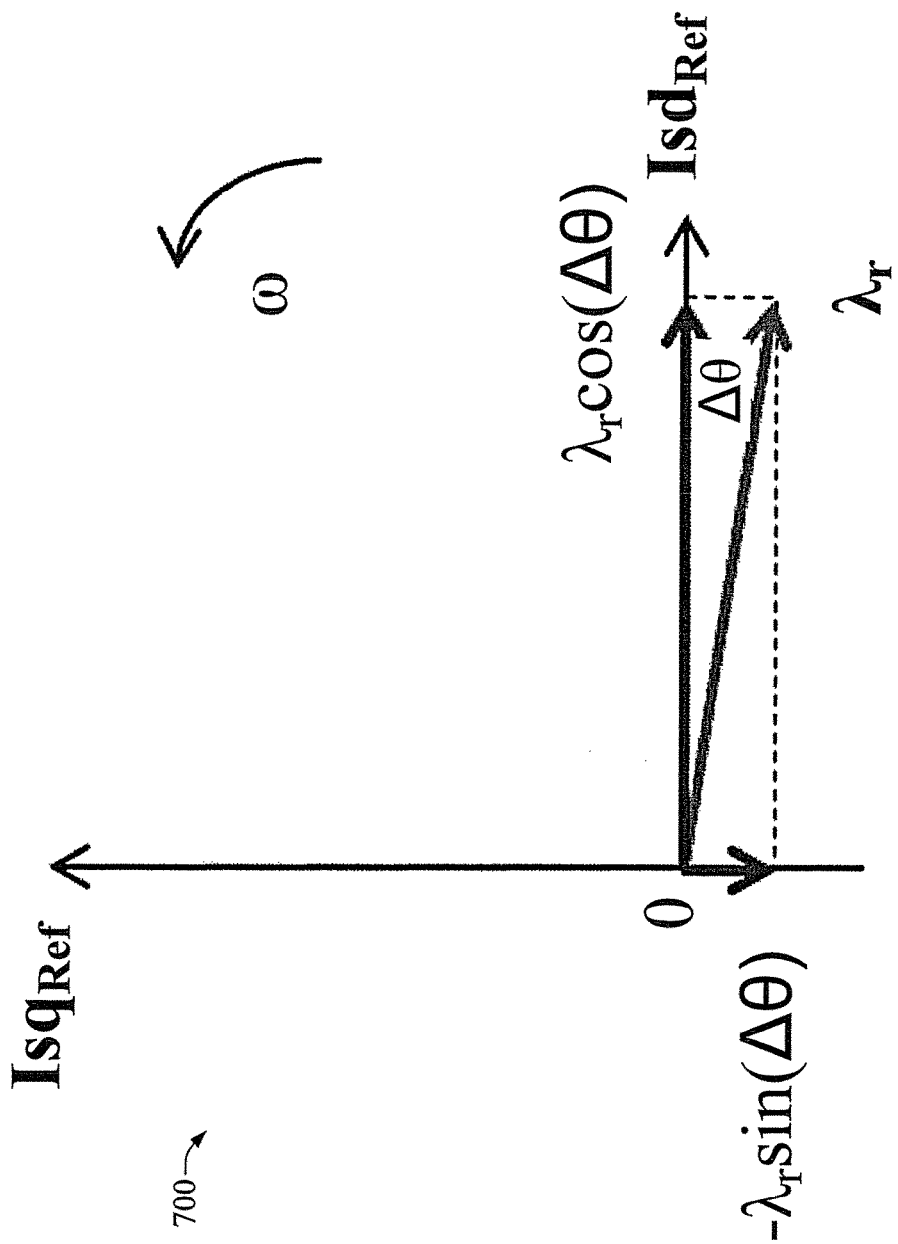
FIG. 7 is a graph illustrating projection of rotor flux $\lambda_r$ on the reference q,d coordinate system.

Equation (1) is based on the observation that the rotor flux projection on the reference d-axis is equal to $\lambda_r \cos(\Delta\theta)$. FIG. 7 is a graph 700 illustrating projection of the rotor flux $\lambda_r$ on the reference q,d coordinate system. As shown in graph 700, the rotor flux along the d-axis and q-axis is given by $\lambda_r \cos(\Delta\theta)$ and $\lambda_r \sin(\Delta\theta)$, respectively (where $\Delta\theta$ is the angle difference between the d-axis and the rotor flux). The stator flux $\lambda_{sd}$ and $\lambda_{sq}$ in the rotary framework is caused by the current run through the inductance and the rotor flux, according to the following equations:

$$\lambda_{sd} = L_{sd}I_{sd} + \cos(\Delta\theta)\lambda_r \quad (5)$$

$$\lambda_{sq} = L_{sq}I_{sq} + \sin(\Delta\theta)\lambda_r \quad (6)$$

where $\Delta\theta$ is the angle between the d-axis and rotor flux (see FIG. 7); $I_{sd}$ and $I_{sq}$ are the stator current along the d-axis and q-axis, respectively; $L_{sd}$ and $L_{sq}$ are stator inductances along the d-axis and q-axis, respectively, which are obtained from the motor datasheet for the PMSM or measured using any suitable self-commissioning method; and $\lambda_r$ is the rotor flux magnitude (known or identified). Subtracting $L_{sd}I_{sd}$ from both sides of equation (5) yields $$\lambda_{sd} - L_{sd}I_{sd} = \cos(\Delta\theta)\lambda_r = \lambda_{r,sd}$$

Once the startup current reference component 406 determines the rotor flux projection $\lambda_{r,sd}$ on the d-axis using equation (1), startup current reference component 406 compares the determined value of $\lambda_{r,sd}$ with $\lambda_r \cos(\Theta_0)$, where $\Theta_0$ is a predefined value (e.g., $\pi/3$). A low-pass filter is applied to the $\lambda_{r,sd}$ calculation. The applied stator flux current reference $I_{sdRef}$ is assumed to be large enough to spin the motor if rotor flux projection $\lambda_{r,sd}$ is equal to or greater than $\lambda_r \cos(\Theta_0)$.

If it is determined, based on the comparison, that $\lambda_{r,sd}$ is less than $\lambda_r \cos(\Theta_0)$, the startup current reference component 406 increases the stator flux current reference $I_{sdRef}$ until it reaches a predefined value $I_{sdmax}$ (which may be set to the rated current), or until rotor flux projection $\lambda_{r,sd}$ becomes greater than or equal to $\lambda_r \cos(\Theta_0)$, causing the rotor to spin. As can be seen on timing chart 604, projection $\lambda_{r,sd}$ becomes greater than or equal to $\lambda_r \cos(\Theta_0)$ at time t=t3, when reference $I_{sdRef}$ reaches $I_{SD1}$. At this time, the rotor flux projection $\lambda_{r,sd}$ on the stator d-axis is considered large enough and reference $I_{sdRef}$ is held constant at $I_{SD1}$ to force the rotor to follow the reference speed $\omega_{Ref}$.

Figure 8:
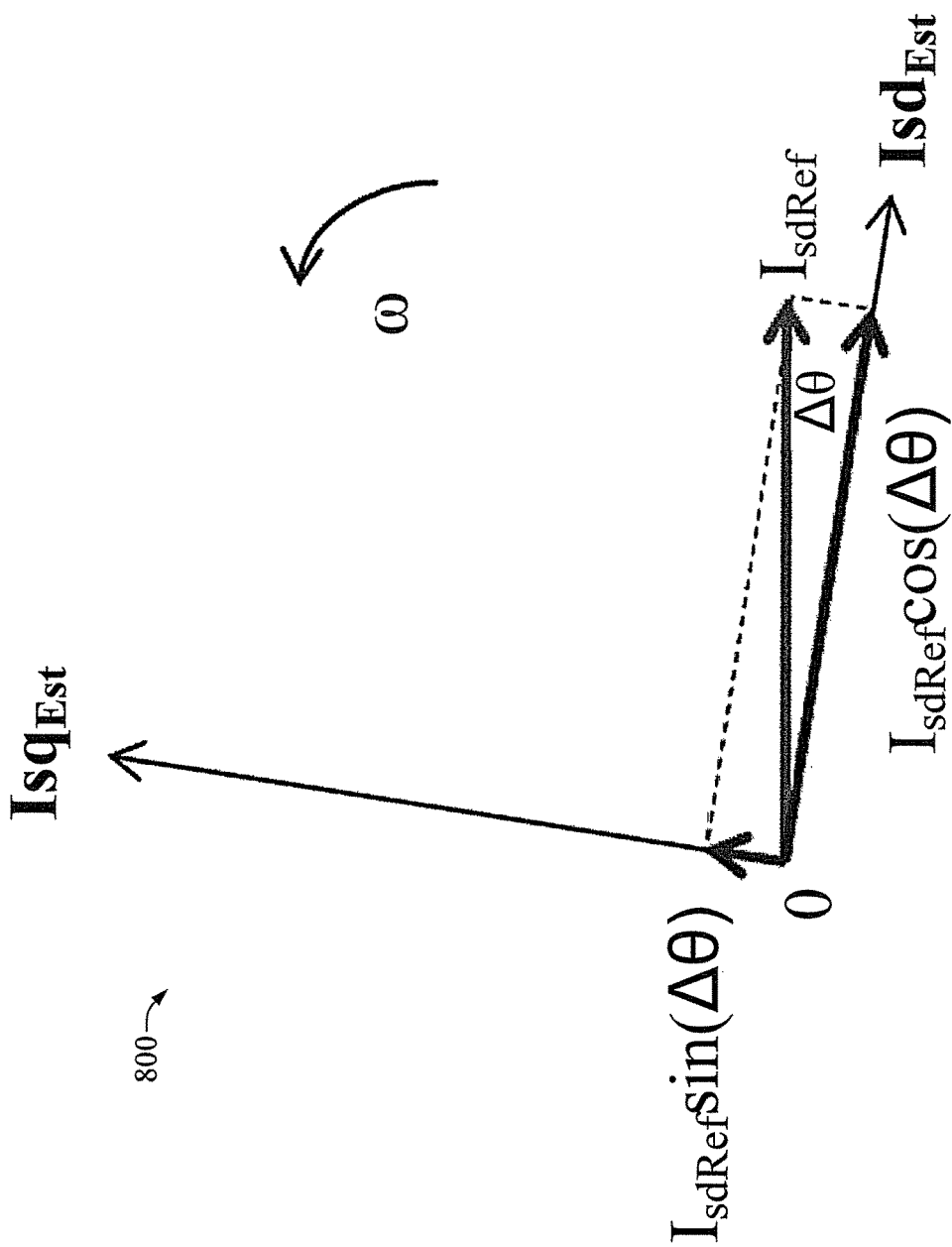
FIG. 8 is a graph of the projection of current reference $I_{sdRef}$ on the estimated d,q coordinate system, showing the angle difference $\Delta\theta$ between the $I_{sdRef}$ vector and the estimated rotary coordinate frame.

At this point, the startup current reference component 406 starts to determine the angle difference $\Delta\theta$ between the reference angle of the $I_{sdRef}$ vector and the estimated angle (estimated based on the measured stator currents). FIG. 8 is a graph 800 of the projection of current reference $I_{sdRef}$ on the estimated d,q coordinate system, showing the angle difference $\Delta\theta$ between the $I_{sdRef}$ vector and the estimated rotary coordinate frame. A low-pass filter can be applied to $\Delta\theta$ in order to obtain a smoother signal. As the estimation component 412 obtains a more accurate estimation, $\Delta\theta$ will eventually converge to a steady state $\Theta_1$, which reflects the load on the PMSM. Timing chart 604 shows the value of $\Delta\theta$ converging to $\Theta_1$ at time t=t4. Since $\Theta_1$ is a function of the load on the PMSM, this value is used as the basis for the initial value of reference $I_{sqRef}$ for the closed-loop sensorless FOC control phase.

Once the value of $\Theta_1$ is determined, the startup current reference component 406 sets the initial reference $I_{sqRef}$ as:

$$I_{sqRef} = I_{SD1} \sin(\Theta_1) \quad (7)$$

With the estimation component 412 ready at time t=t4 (as determined using any suitable detection method, or based on a determination that a predefined speed has been obtained), the system transitions from control based on the reference angle $\theta_{Ref}$ to control based on the estimated angle $\theta_{Est}$, as represented by the lower-most switch of switching component 510. The system can make this transition gradual to facilitate smooth operation. For example, an angle blending method can be used to transition from the reference angle $\theta_{Ref}$ to the estimated angle $\theta_{Est}$. At the same time, as shown in timing charts 606 and 608, the startup current reference component 406 will decrease the reference $I_{sdRef}$ from $I_{SD1}$ to zero, and will ramp the reference $I_{sqRef}$ from 0 to $I_{SD1} \sin(\Theta_1)$ between time t=t4 and t=t5. This period represents a transition period between reference startup FOC control and closed-loop sensorless FOC control.

Figure 9:
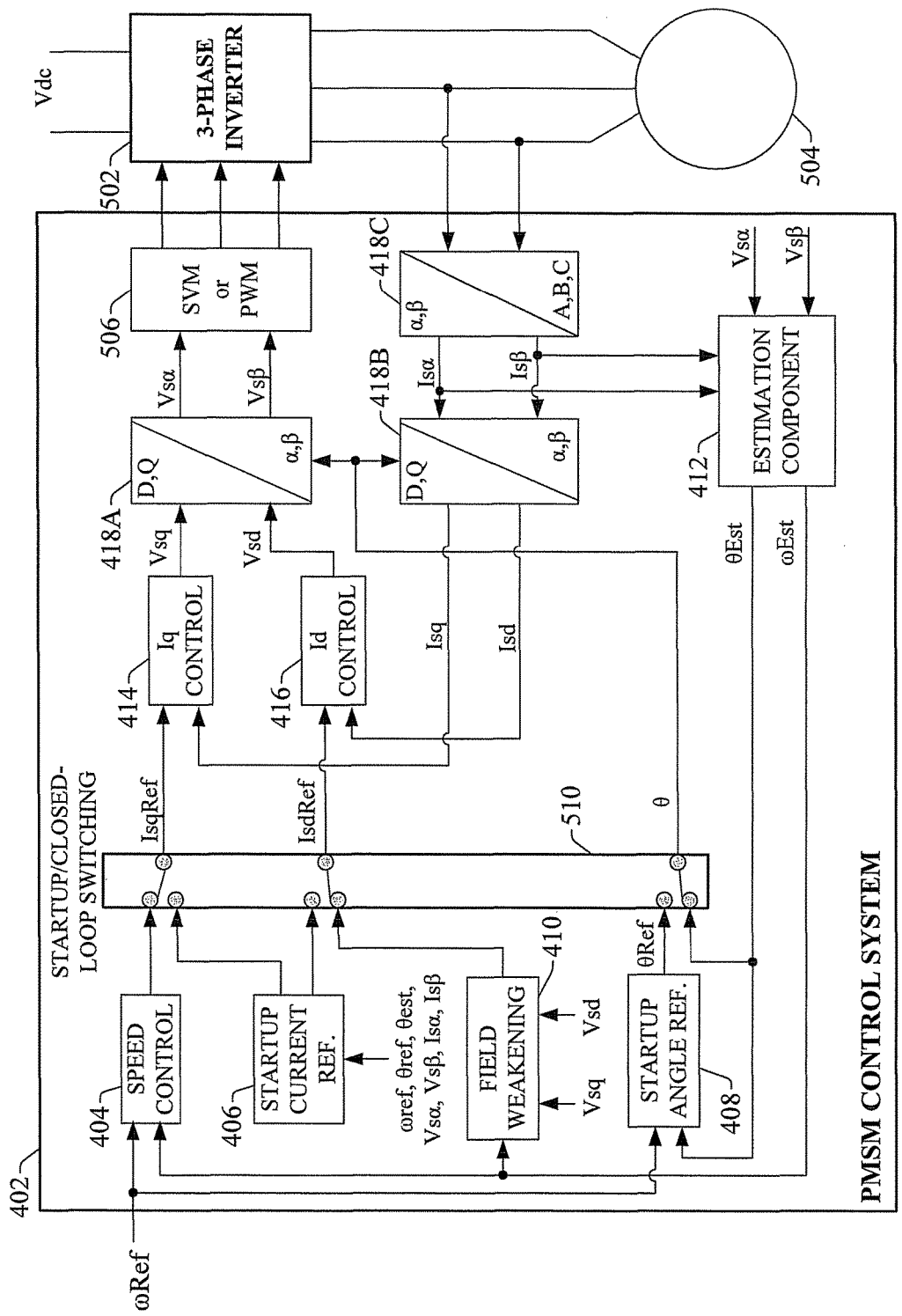
FIG. 9 is a block diagram of an example configuration for a PMSM control system running in closed-loop sensorless FOC control mode.

After time t=t5, the system is in the closed-loop sensorless FOC control region, and the PMSM is controlled in accordance with the external speed reference signal $\omega_{Ref}$. FIG. 9 depicts the example PMSM control system 402 with the switching component 510 configured for closed-loop sensorless FOC control (beginning at time t=t5). Torque reference $I_{sqRef}$ is now controlled by speed control component 404, which controls the value of $I_{sqRef}$ based on the error between the speed reference $\omega_{Ref}$ and the estimated speed $\omega_{Est}$ determined by estimation component 412 (based on the measured back-EMF). Flux reference $I_{sdRef}$ is now controlled by field weakening component 410. In an example scenario, field weakening component 410 may hold reference $I_{sdRef}$ at zero unless motor operation enters the field weakening region. Estimated angle $\theta_{Est}$ is used as the feedback angle $\theta$ for the park and inverse park transforms rather than reference angle $\theta_{Ref}$. Since the initial value of reference $I_{sqRef}$ when closed-loop sensorless control begins is reflective of the load on the PMSM, the transition between reference startup FOC control and closed-loop sensorless FOC control will be smooth.

Figure 10:
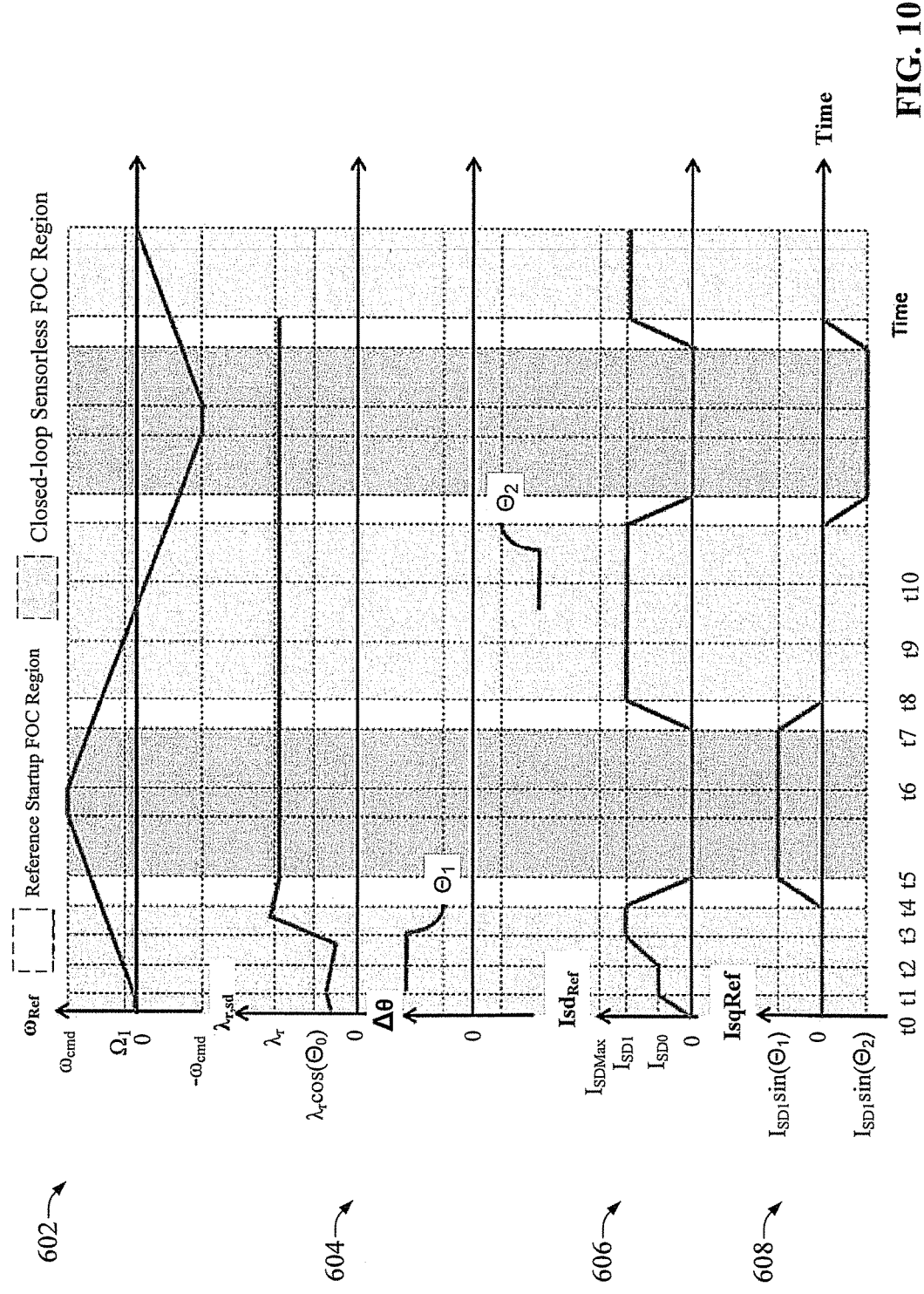
FIG. 10 is a set of timing charts illustrating transition from closed-loop sensorless FOC control back to reference startup control.

FIG. 10 depicts timing charts 602, 604, 606, and 608 extended in time to illustrate transition from closed-loop sensorless FOC control back to reference startup control according using techniques described herein. At time t=t6, the reference speed $\omega_{Ref}$ begins decreasing to return to the reference startup FOC control state. At time t=t7, the control system begins switching from the estimated angle $\theta_{Est}$ to the reference angle $\theta_{Ref}$ for control of the PMSM (e.g., using an angle blending technique), where the reference angle is the integration of the reference speed $\omega_{Ref}$ with the initial value of the estimated angle $\theta_{Est}$ when the transition begins. At the same time, between time t=t7 and t=t8 (the transition period between closed-loop sensorless FOC control and reference startup control), the startup current reference component 406 reduces reference $I_{sqRef}$ to 0, and increases reference $I_{sdRef}$ from 0 to $I_{SD1}$ (the value previously determined at time t=t3 as being the value of $I_{sdRef}$ when $\lambda_{r,sd}$ became greater than or equal to $\lambda_r \cos(\Theta_0)$).

During the reference startup FOC control stage beginning at time t=t8, the rotor flux projection on the stator d-axis is again compared with $\lambda_r \cos(\Theta_0)$, and $I_{sdRef}$ is adjusted accordingly. If the speed continues decreasing to negative speed—reversing the direction of rotation of the PMSM, beginning at the zero crossover point of timing chart 602—a new angle difference $\Theta_2$ is determined and used for the initial value of reference $I_{sqRef}$ during transition to closed-loop sensorless FOC control.

Although the example above uses the current reference on the d-axis to determine the appropriate initial value for reference $I_{seRef}$, the techniques described above can also be applied to the reference startup FOC control with the current reference on the q-axis instead of the d-axis, with corresponding modifications to the equations. For example, the quantities in equation (1) determined along the d-axis can be replaced by their corresponding quantities along the q-axis, and the rotor flux projection $\lambda_{r,sq}$ on the q-axis can be compared with $\lambda_r \sin(\Theta_0)$—rather than $\lambda_r \cos(\Theta_0)$—in order to determine when there is sufficient spin on the motor.

Figure 11A:
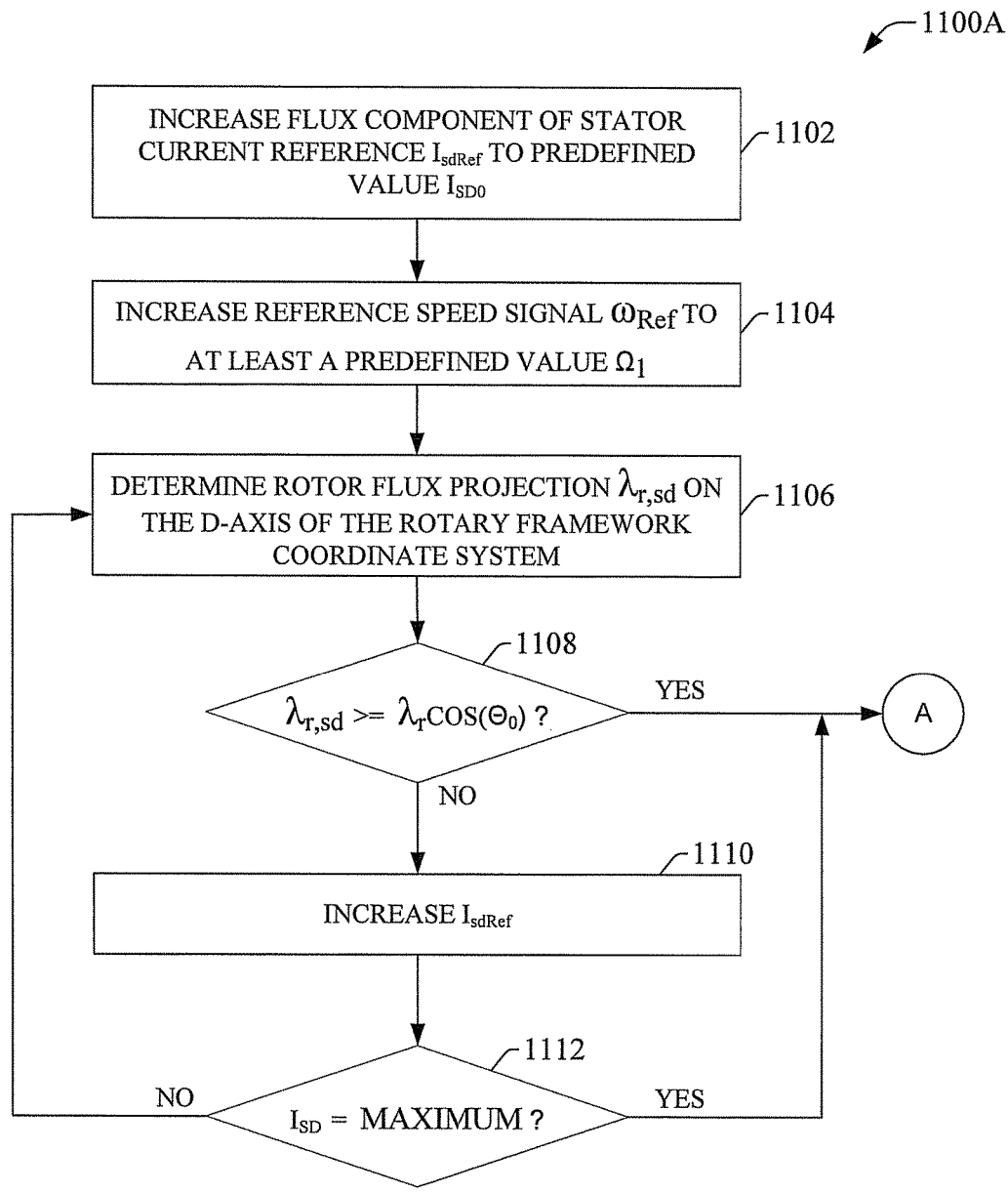
FIG. 11A is a flowchart of a first part of an example methodology for smoothly transitioning from reference startup FOC control of a PMSM to closed-loop sensorless FOC control.
Figure 11B:
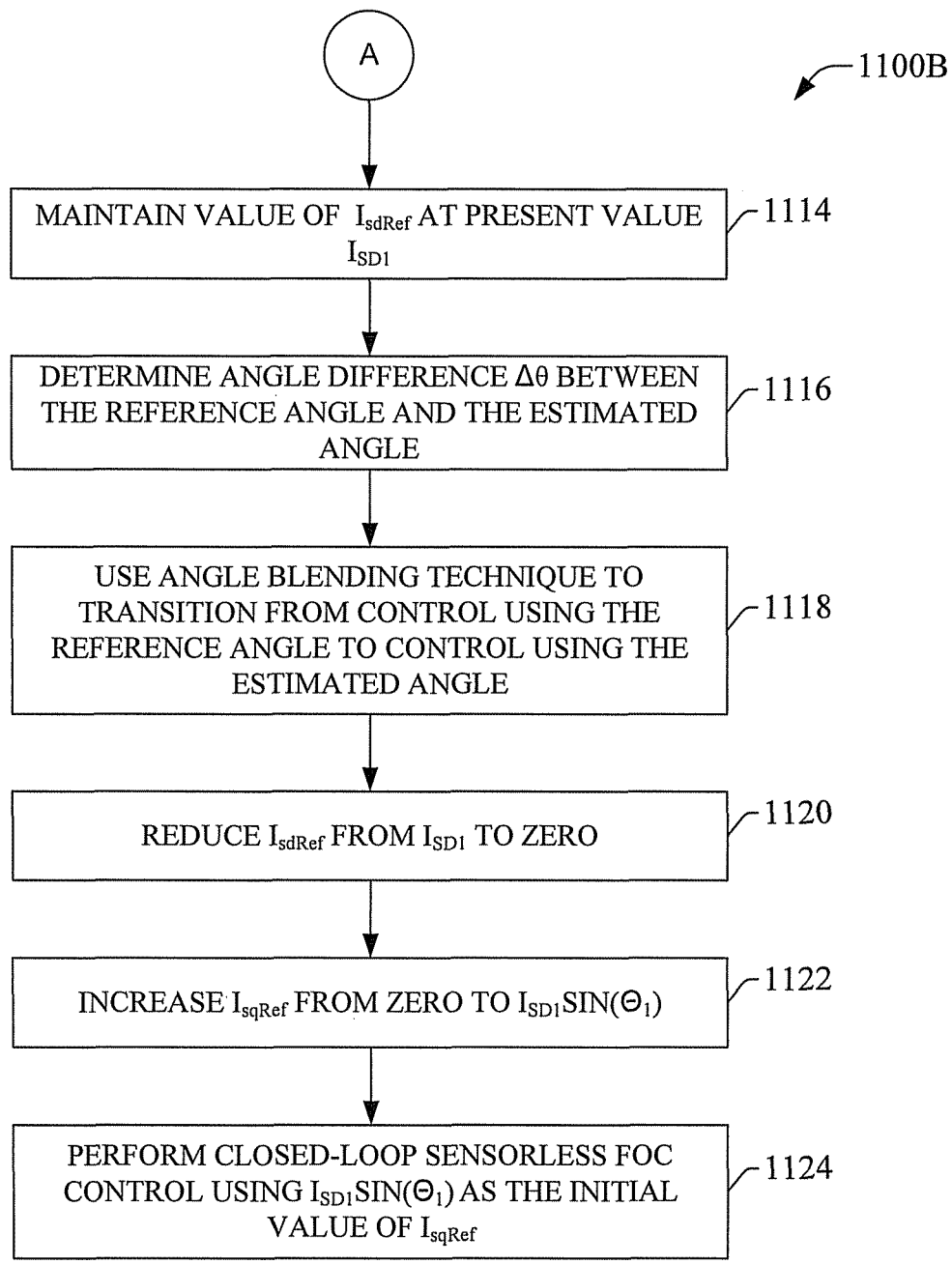
FIG. 11B is a flowchart of a second part of an example methodology for smoothly transitioning from reference startup FOC control of a PMSM to closed-loop sensorless FOC control.

FIGS. 11A-11B illustrate an example methodology in accordance with certain disclosed aspects. While, for purposes of simplicity of explanation, the methodology is shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects. Additionally, it is to be further appreciated that the methodologies disclosed hereinafter and throughout this disclosure are capable of being stored on an article of manufacture to facilitate transporting and transferring such methodologies to computers.

FIG. 11A illustrates a first part of an example methodology 1100A for smoothly transitioning from reference startup FOC control of a PMSM to closed-loop sensorless FOC control. Initially, at 1102 with the PMSM at rest, the flux component of a stator control current reference signal $I_{sdRef}$ is increased to a predefined value $I_{SD0}$ that is less than the rated current of the PMSM (e.g., 20% of the rated current). At 1104, a reference speed signal $\omega_{Ref}$ is increased to at least a predefined value $\Omega_1$.

At 1106, when the reference speed signal has reached $\Omega_1$, the rotor flux projection on the d-axis of the rotary framework coordinate system $\lambda_{r,sd}$ is determined. The rotor flux projection can be determined, for example, using equation (1) described above. At 1108, a determination is made regarding whether the rotary flux projection $\lambda_{r,sd}$ is greater than or equal to $\lambda_r \cos(\Theta_0)$, wherein $\Theta_0$ is a predefined value (e.g., $\pi/3$). If it is determined at step 1108 that the rotary flux projection $\lambda_{r,sd}$ is not greater than or equal to $\lambda_r \cos(\Theta_0)$ (NO at step 1108), the stator d-current reference signal $I_{sdRef}$ is increased at 1110, and a determination is made regarding whether $I_{sdRef}$ has reached a maximum value. If $I_{sdRef}$ has reached its maximum value (YES at 1112), the methodology moves to the second part of the methodology 1100B, described below. Alternatively, if $I_{sdRef}$ has not reached its maximum (NO at 1112), the methodology returns to step 1106, where the rotor flux projection $\lambda_{r,sd}$ is again determined, and the new flux projection $\lambda_{r,sd}$ is compared with $\lambda_r \cos(\Theta_0)$ at step 1108. Steps 1106-1112 are repeated until either $I_{sdRef}$ reaches its maximum value, or until projection $\lambda_{r,sd}$ becomes greater than or equal to $\lambda_r \cos(\Theta_0)$ (YES at step 1108), at which time the methodology proceeds to the second part 1100B.

FIG. 11B is the second part of the example methodology 1100B. At 1114, the value of $I_{sdRef}$ at or around the time that $\lambda_{r,sd}$ became greater than or equal to $\lambda_r \cos(\Theta_0)$ (or the time that $I_{sdRef}$ reached its maximum value) is maintained (referred to herein as $I_{SD1}$). At 1116, the angle difference $\Delta\theta$ between the reference angle of the $I_{sdRef}$ vector and the estimated angle (estimated based on the measured stator currents). This angle difference, which is a function of the unknown load on the PMSM, will converge to a steady value $\Theta_1$.

Steps 1118-1122 may be performed concurrently, or during overlapping time periods. At 1118, an angle blending technique is used to transition from control using the reference angle to control using the estimated angle. At 1120, reference $I_{sdRef}$ is reduced from $I_{SD1}$ to zero. At 1122, reference $I_{sqRef}$—the torque component the stator control signal—is increased from zero to $I_{SD1} \sin(\Theta_1)$, where $I_{SD1}$ is the value of the reference signal $I_{sdRef}$ determined at step 1114, and $\Theta_1$ is the angle difference determined at step 1116. Using $I_{SD1} \sin(\Theta_1)$ as the initial value for reference $I_{sqRef}$ at the start of closed-loop sensorless FOC control can facilitate a smooth transition from the reference startup FOC control mode to the closed-loop sensorless FOC control mode. At 1124 closed-loop sensorless FOC control of the PMSM is performed using $I_{SD1} \sin(\Theta_1)$ as the initial value of reference $I_{sqRef}$.

It is to be appreciated that certain steps of the methodology illustrated in FIGS. 11A and 11B can be modified to use the rotor flux projection $\lambda_{r,sq}$ on the q-axis rather than $\lambda_{r,sd}$ on the d-axis. For example, in such an operating scenario, the decision step 1108 will compare $\lambda_{r,sq}$ with $\lambda_r \sin(\Theta_0)$ rather than $\lambda_r \cos(\Theta_0)$.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments of the motion profile generating system described herein can be implemented in any computer system or environment having any number of memory or storage units (e.g., memory 422 of FIG. 4), and any number of applications and processes occurring across any number of storage units. This includes, but is not limited to, an environment with server computers and client computers deployed in a network environment or a distributed computing environment, having remote or local storage. For example, with reference to FIG. 4, speed control component 404, startup current reference component 406, startup angle reference component 408, field weakening component 410, estimation component 412, Iq control component 414, Id control component 416, and transformation component 418 can be stored on a single memory 422 associated with a single device, or can be distributed among multiple memories associated with respective multiple devices. Similarly, speed control component 404, startup current reference component 406, startup angle reference component 408, field weakening component 410, estimation component 412, Iq control component 414, Id control component 416, and transformation component 418 can be executed by a single processor 420, or by multiple distributed processors associated with multiple devices.

Distributed computing provides sharing of computer resources and services by communicative exchange among computing devices and systems. These resources and services include the exchange of information, cache storage and disk storage for objects. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 12:
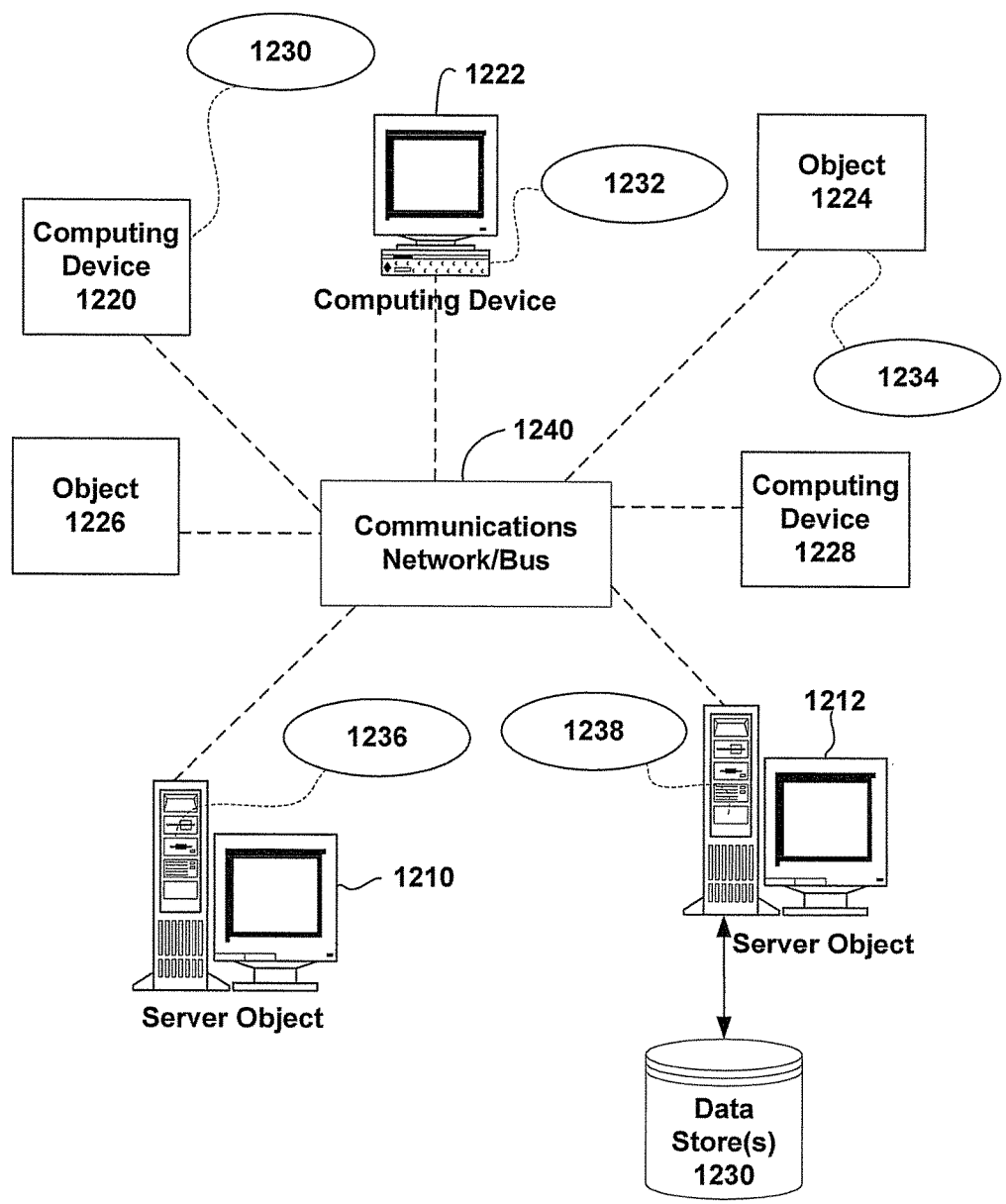
FIG. 12 is a block diagram representing an exemplary networked or distributed computing environment for implementing one or more embodiments described herein.

FIG. 12 provides a schematic diagram of an exemplary networked or distributed computing environment. The distributed computing environment includes computing objects 1210, 1212, etc. and computing objects or devices 1220, 1222, 1224, 1226, 1228, etc., which may include programs, methods, data stores, programmable logic, etc., as represented by applications 1230, 1232, 1234, 1236, 1238. It can be appreciated that computing objects 1210, 1212, etc. and computing objects or devices 1220, 1222, 1224, 1226, 1228, etc. may comprise different devices, such as personal digital assistants (PDAs), audio/video devices, mobile phones, MP3 players, personal computers, laptops, tablets, etc., where embodiments of the profile generator described herein may reside on or interact with such devices.

Each computing object 1210, 1212, etc. and computing objects or devices 1220, 1222, 1224, 1226, 1228, etc. can communicate with one or more other computing objects 1210, 1212, etc. and computing objects or devices 1220, 1222, 1224, 1226, 1228, etc. by way of the communications network 1240, either directly or indirectly. Even though illustrated as a single element in FIG. 12, communications network 1240 may comprise other computing objects and computing devices that provide services to the system of FIG. 12, and/or may represent multiple interconnected networks, which are not shown. Each computing object 1210, 1212, etc. or computing objects or devices 1220, 1222, 1224, 1226, 1228, etc. can also contain an application, such as applications 1230, 1232, 1234, 1236, 1238, that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 12, as a non-limiting example, computing objects or devices 1220, 1222, 1224, 1226, 1228, etc. can be thought of as clients and computing objects 1210, 1212, etc. can be thought of as servers where computing objects 1210, 1212, etc. provide data services, such as receiving data from client computing objects or devices 1220, 1222, 1224, 1226, 1228, etc., storing of data, processing of data, transmitting data to client computing objects or devices 1220, 1222, 1224, 1226, 1228, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 1240 is the Internet, for example, the computing objects 1210, 1212, etc. can be Web servers, file servers, media servers, etc. with which the client computing objects or devices 1220, 1222, 1224, 1226, 1228, etc. communicate via any of a number of known protocols, such as the hypertext transfer protocol (HTTP). Computing objects 1210, 1212, etc. may also serve as client computing objects or devices 1220, 1222, 1224, 1226, 1228, etc., as may be characteristic of a distributed computing environment.

Exemplary Computing Device

Figure 13:
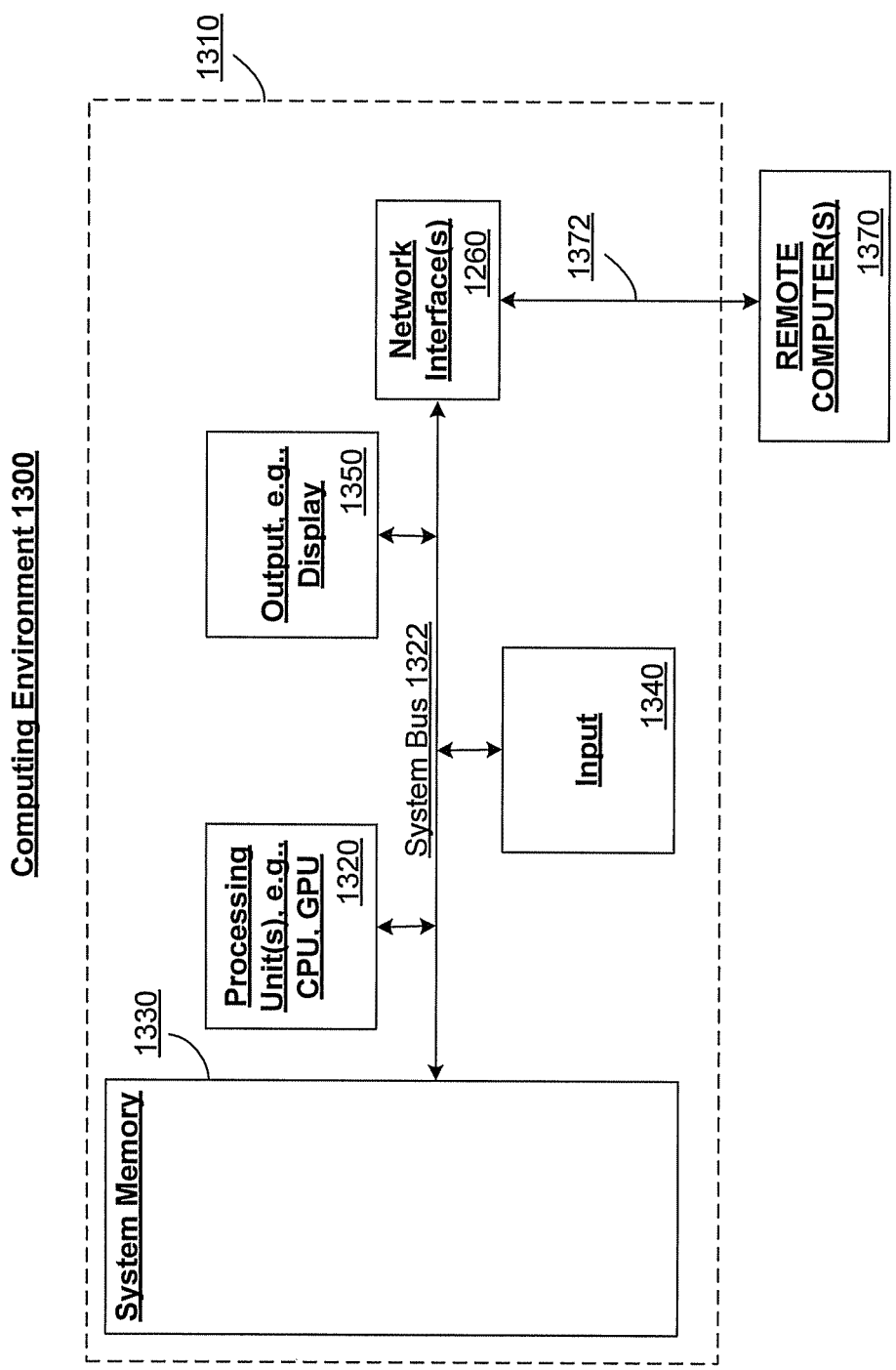
FIG. 13 is a block diagram representing an exemplary computing system or operating environment for implementing one or more embodiments described herein.

As mentioned, advantageously, the techniques described herein can be applied to any suitable device. It is to be understood, therefore, that handheld, portable and other computing devices and computing objects of all kinds are contemplated for use in connection with the various embodiments. Accordingly, the below computer described below in FIG. 13 is but one example of a computing device. Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 13 thus illustrates an example of a suitable computing system environment 1300 in which one or aspects of the embodiments described herein can be implemented, although as made clear above, the computing system environment 1300 is only one example of a suitable computing environment and is not intended to suggest any limitation as to scope of use or functionality. Neither is the computing system environment 1300 be interpreted as having any dependency or requirement relating to any one or combination of components illustrated in the exemplary computing system environment 1300.

With reference to FIG. 13 an exemplary computing device for implementing one or more embodiments in the form of a computer 1310 is depicted. Components of computer 1310 may include, but are not limited to, a processing unit 1320, a system memory 1330, and a system bus 1322 that couples various system components including the system memory to the processing unit 1320. Processing unit 1320 may, for example, perform functions associated with processor(s) 420 of PMSM control system 402, while system memory 1330 may perform functions associated with memory 422.

Computer 1310 typically includes a variety of computer readable media and can be any available media that can be accessed by computer 1310. The system memory 1330 may include computer storage media in the form of volatile and/or nonvolatile memory such as read only memory (ROM) and/or random access memory (RAM). By way of example, and not limitation, system memory 1330 may also include an operating system, application programs, other program modules, and program data.

A user can enter commands and information into the computer 1310 through input devices 1340, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 1310. A monitor or other type of display device is also connected to the system bus 1322 via an interface, such as output interface 1350. In addition to a monitor, computers can also include other peripheral output devices such as speakers and a printer, which may be connected through output interface 1350. In one or more embodiments, input devices 1340 can provide user input to PMSM control system 402, while output interface 1350 can receive and display information relating to operations of PMSM control system 402.

The computer 1310 may operate in a networked or distributed environment using logical connections to one or more other remote computers, such as remote computer 1370. The remote computer 1370 may be a personal computer, a server, a router, a network PC, a peer device or other common network node, or any other remote media consumption or transmission device, and may include any or all of the elements described above relative to the computer 1310. The logical connections depicted in FIG. 13 include a network 1372, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media (e.g., memory 422) and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in inferences described herein, components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In view of the exemplary systems described above, methodologies that may be implemented in accordance with the described subject matter will be better appreciated with reference to the flowcharts of the various figures (e.g., FIGS. 10A-10B). While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A system, comprising:
an electric motor; and
a controller configured to generate a control signal that controls a velocity of the electric motor during a reference startup operation and a closed-loop sensorless control operation,
the controller being configured to generate the control signal for the reference startup operation based on a value of a stator flux current reference determined based on a rotor flux projection on a reference d-axis of a rotary framework coordinate system,
wherein the controller is configured to increase the stator flux current reference during the reference startup operation, and to set the stator flux current reference for the reference startup operation equal to a value $I_{SD1}$ at a time that the rotor flux projection is determined to be equal to or greater a defined threshold.

2. The system of claim 1, wherein the electric motor comprises a permanent magnet synchronous motor.

3. The system of claim 1, wherein the electric motor comprises an internal permanent magnet motor.

4. The system of claim 1, wherein the electric motor comprises a traction motor of an electric vehicle.

5. The system of claim 1, wherein the controller is configured to determine the rotor flux projection based on a difference between a stator flux along the d-axis and a product of a stator inductance along the d-axis and a stator current along the d-axis.

6. The system of claim 1, wherein the controller is configured to set the defined threshold to be equal to or approximately equal to $\cos(\Theta_0)\lambda_r$, where $\Theta_0$ is a predefined value and $\lambda_r$ is a rotor flux.

7. The system of claim 1, wherein the controller is configured to, during the reference startup operation, determine an angle difference between a reference angle of a vector of the stator flux current reference and an estimated angle determined based on measured stator currents.

8. The system of claim 7, wherein the controller is further configured to set an initial value of a stator torque current reference of the control signal for the closed-loop sensorless control operation based on the angle difference.

9. The system of claim 8, wherein the controller is configured to set the initial value of the stator torque current reference for the closed-loop sensorless control operation based on a product of $I_{SD1}$ and a sine of the angle difference.

10. The system of claim 8, wherein the controller is further configured to, during an intermediate period between the reference startup operation and the closed-loop sensorless control operation, reduce the stator flux current reference from $I_{SD1}$ to zero, and increase the stator torque current reference from zero to the initial value of the stator torque current reference.

11. The system of claim 10, wherein the controller is further configured to, during the intermediate period, transition from control based on the reference angle to control based on the estimated angle using an angle blending algorithm.

12. The system of claim 5, wherein the controller is further configured to determine a stator flux $\lambda_{s\alpha}$ along an α-axis of a stationary framework coordinate system and a stator flux $\lambda_{s\beta}$ along a β-axis of the stationary framework coordinate system according to:

$$\lambda_{s\alpha}=\int(V_{s\alpha}-R_sI_{s\alpha})dt$$

$$\lambda_{s\beta}=\int(V_{s\beta}-R_sI_{s\beta})dt$$

and to determine the stator flux by performing a Park transformation on $\lambda_{s\alpha}$ and $\lambda_{s\beta}$, where $V_{s\alpha}$ and $V_{s\beta}$ are applied stator voltages along the α-axis and the β-axis, respectively, $I_{s\alpha}$ and $I_{s\beta}$ are measured stator currents along the α-axis and the β-axis, respectively, and $R_s$ is a stator resistance.

13. A method for performing sensorless field oriented control of an electric motor, comprising:
    determining, by a controller comprising at least one processor, a value of a stator flux current reference based on a rotor flux projection on a reference d-axis of a rotary framework coordinate system; and
    generating, by the controller, a control signal that controls a velocity of the electric motor, during a reference startup mode and a closed-loop sensorless control mode, based on the value of the stator flux reference current,
    wherein the determining comprises:
    increasing the stator flux current reference during the reference startup mode; and
    setting the value $I_{SD1}$ of the stator flux current reference equal to a value of the stator flux current reference at a time that the rotor flux projection is determined to be equal to or greater than a defined threshold value.

14. The method of claim 13, wherein the determining comprises determining the rotor flux projection based on a difference between a stator flux along the d-axis and a product of a stator inductance along the d-axis and a stator current along the d-axis.

15. The method of claim 13, further comprising controlling the velocity of the electric motor based on the control signal, wherein the electric motor comprising a traction motor of an electric vehicle.

16. The method of claim 13, wherein the generating comprises:
    determining, during the reference startup mode, an angle difference between a reference angle of a vector of the stator flux current reference and an estimated angle determined based on measured stator currents; and
    setting, an initial value of a stator torque current reference of the control signal based on the angle difference.

17. The method of claim 16, wherein the setting the initial value of the stator torque current reference comprises setting the initial value based on a product of $I_{SD1}$ and a sine of the angle difference.

18. A non-transitory computer-readable medium having stored thereon executable instructions that, in response to execution, cause a control system to perform operations, comprising:
    determining a value of a stator flux current reference based on a rotor flux projection on a reference d-axis of a rotary framework coordinate system; and
    generating a control signal that controls a velocity of an electric motor, during a reference startup mode and a closed-loop sensorless control mode, based on the value of the stator flux reference current,
    wherein the determining comprises:
    increasing the stator flux current reference during the reference startup mode; and
    setting the value $I_{SD1}$ of the stator flux current reference equal to a value of the stator flux current reference at a time that the rotor flux projection is determined to be equal to or greater than a defined threshold value.

19. The non-transitory computer-readable medium of claim 18, wherein the determining comprises determining the rotor flux projection based on a difference between a stator flux along the d-axis and a product of a stator inductance along the d-axis and a stator current along the d-axis.

20. The non-transitory computer-readable medium of claim 18, wherein the generating comprises:
    determining, during the reference startup mode, an angle difference between a reference angle of a vector of the stator flux current reference and an estimated angle determined based on measured stator currents; and
    setting, an initial value of a stator torque current reference of the control signal based on the angle difference.

* * * * *